July 15, 1930.   E. J. FARKAS   1,770,466
BUMPER
Filed Sept. 12, 1929
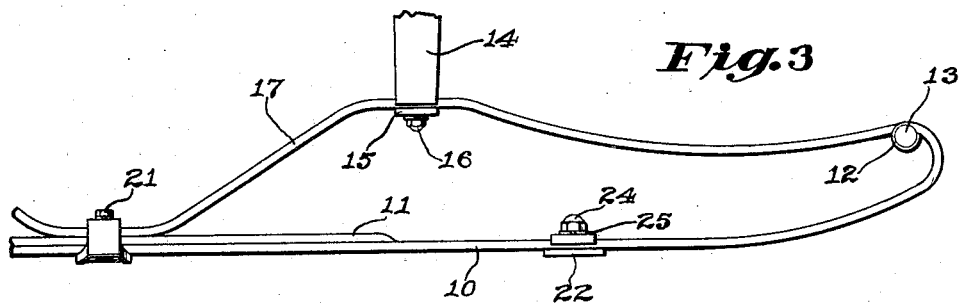
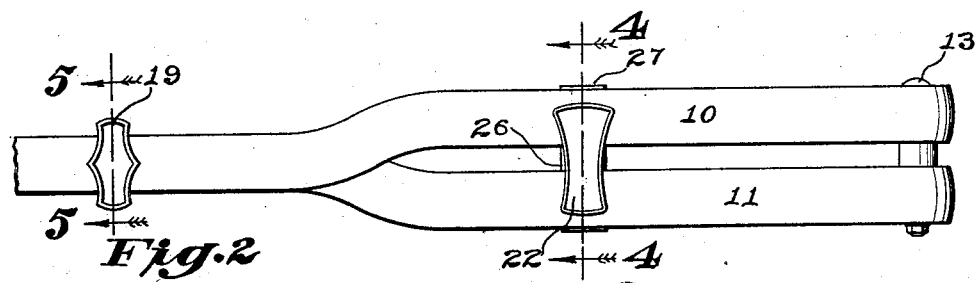
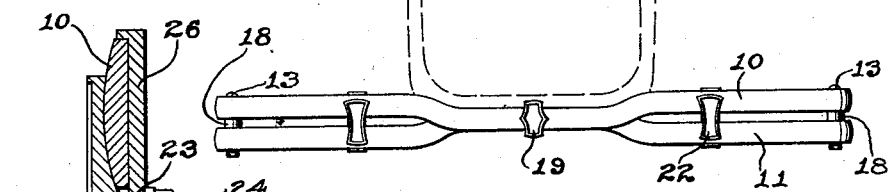
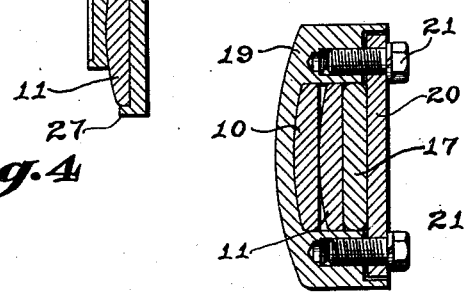
INVENTOR.
E. J. Farkas
BY
ATTORNEY.

Patented July 15, 1930

1,770,466

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

BUMPER

Application filed September 12, 1929. Serial No. 392,196.

An object of my invention is to provide a bumper of simple, durable and relatively inexpensive construction.

Still a further object of my invention is to provide a bumper which will give maximum protection to an automobile with a minimum of weight.

Still a further object of my invention is to provide a bumper which will be relatively wide in order to present a relatively wide space to thereby protect the car from obstacles of varying heights above the ground, and also provide a bumper which will be very rigid and strongly resist impacts.

Still a further object of my invention is to provide a bumper which has bars spaced from each other adjacent to each end thereof and bars in the same horizontal plane in the central portions thereof whereby the bumper may have relatively great height and also great strength.

With these and other objects in view my invention consists in the arrangement, combination and construction of the various parts of my improved device as described in the specification, claimed in the claims, and illustrated in the accompanying drawings in which:

Figure 1 shows a front elevation of a bumper made in accordance with my invention.

Figure 2 shows an enlarged front elevation of one end of the bumper.

Figure 3 shows a top or plan view of the parts shown in Figure 2.

Figure 4 shows a vertical sectional view taken on the line 4—4 of Figure 2, and

Figure 5 shows a vertical sectional view taken on the line 5—5 of Figure 2.

Referring to the accompanying drawings, I have used the reference numerals 10 and 11 to indicate the upper and lower cross bars of my improved bumper. A spring eye 12 is formed at each end of each bumper bar and a bolt 13 is extended through the eyes at the adjacent ends of the bumper bars to tie the ends of the bars together. The forward end 14 of the side frame member of a car is arranged to have a clip 15 and a bolt 16 associated therewith in such a way that the bumper rear supporting bar 17 may be clamped between said clip and the forward end of said frame member. This bumper supporting bar 17 is provided with a spring eye 18 at each end thereof so that the adjacent bolt 13 may pass therethrough and tie the supporting bar to the impact receiving bars at their ends by means of a hinge joint.

It will be noted that the impact bars 10 and 11 are spaced vertically from each other at either side of the car but are offset in a vertical plane adjacent to their central portions so that their central portions lie in the same horizontal plane. The central portion of the bumper supporting bar 17 is brought forwardly so that the three bars 10, 11, and 17 across the center of the car are all in the same horizontal plane.

The central portions of the bars are clamped together in the manner illustrated in Figure 5. In this view it will be seen that a clamp member 19 of U shape in vertical section is placed over the bars 10, 11, and 17 and then a clip 20 is forced into the clamp 19 by the screws 21 so as to very tightly clamp the bars 10, 11, and 17 together with a strong frictional engagement. It will thus be seen that if the car should run into some very heavy or immovable object, such for instance, as a telegraph pole, then that the distortion of the bumper will be resisted not only by the combined resiliency of the materials from which the bumper bars are composed but also by the frictional engagement of the bars where they are clamped together by the clamping member 19.

At the sides of the car the bumper bars are spaced vertically from each other and held in this vertically spaced relation by the clamp construction illustrated in Figure 4. In this clamp a face plate 22 is provided with an integral stud 23 designed to receive the nut 24 and lock washer 25. The back plate 26 extends a vertical distance greater than the height of the two bumper bars and is provided with flanges 27 at its upper and lower ends which prevent the bumper bars 10 and 11 from spreading away from each other. It will be noted that these bumper bars have front faces of arcuate section and that the face plate 22 is correspondingly curved. This means that the two bars are very rigidly supported relative to each other by means of this clamp which forces the bars into contact with the flanges 27 while the ornamental appearance of the clamp is very acceptable and the weight of the clamp in proportion to its strength is relatively small.

These bumper bars being spaced apart at their ends means that if the bumpers on other cars or other obstacles vary in height to a considerable degree then these bumpers will have a corresponding height to insure contact with the obstacle and to thereby protect the car. This bumper width is a very desirable feature especially as other cars often vary in the height of their bumpers. It will be noted that the ends of this bumper are rounded and are connected by spring eyes with the rear bumper bar so that the danger of the bumper hooking over some object is eliminated and the strength of the bumper is increased.

Among the many advantages arising from the use of my improved bumper, it should be noted that with a minimum of weight very great strength is secured at the central part of the bumper to resist very heavy impacts. At the same time the height of the bumper is retained so that it will give a maximum protection. Still a further advantage results from the fact that the curvature of the portion of the bumper bars where they are offset to overlie each other may be made to conform to the lines of the radiator shell on the car to thereby enhance the appearance of the car. This is illustrated in Figure 1 where the radiator is shown in dotted lines.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a bumper, a rear supporting bar adapted to be mounted on the frame of an automobile, a pair of impact bars, means for pivotally connecting the adjacent ends of the impact bars with the ends of the supporting bar, means for holding said impact bars adjacent to their ends in a vertically spaced relation, and means for clamping the supporting bar and the two impact bars into frictional engagement with each other adjacent to their central portions.

2. In a bumper, a rear supporting bar adapted to be secured to the frame of an automobile, a pair of impact bars having their center portions overlapping, means for pivotally connecting the adjacent ends of the impact bars with the ends of the supporting bar, means for holding said impact bars adjacent to their ends in a vertical spaced relation, and means for clamping the overlapping portions of the impact bars to the supporting bar.

3. In an automobile construction, a radiator, and a pair of horizontal bumper bars disposed in a vertically spaced relation in front of said radiator, the center portions of said bars being overlapped for a sufficient distance to conform to the lines of the lower portion of the radiator.

4. In an automobile construction, a radiator, and a pair of horizontal bumper bars disposed in a vertically spaced relation in front of said radiator, the center portions of the lower and upper bars being raised and lowered, respectively, so as to overlap a sufficient distance to conform to the lines of the lower portion of the radiator.

EUGENE J. FARKAS.